United States Patent [19]
Dries et al.

[11] Patent Number: 5,932,157
[45] Date of Patent: Aug. 3, 1999

[54] SEALABLE COMPOSITE POLYPROPYLENE FILM AND PROCESSES FOR PRODUCING AND USING IT

[75] Inventors: Thomas Dries, Schwabenheim; Gunter Schloegl, Kelkheim; Walter Spaleck, Liederbach; Andreas Winter, Glashuetten, all of Germany

[73] Assignee: Hoechst Aktiengesellschaft, Frankfurt, Germany

[21] Appl. No.: 08/649,448

[22] Filed: May 17, 1996

Related U.S. Application Data

[62] Division of application No. 08/107,978, Aug. 18, 1993, Pat. No. 5,529,843.

[30] Foreign Application Priority Data

Aug. 29, 1992 [DE] Germany .............................. 42 28 812

[51] Int. Cl.⁶ .................................................. B32B 3/20
[52] U.S. Cl. ...................... 264/176.1; 264/177.1; 264/176.1; 264/184; 264/209.6; 264/209.5; 264/211.12; 264/211.2; 264/241; 264/290.2; 264/292; 478/516; 478/349; 478/402; 478/336; 478/339
[58] Field of Search .................................. 428/516, 349, 428/910, 402, 336, 333; 156/144.11; 264/171, 176.1, 177.1, 209.6, 171.1, 209.5, 184, 211.12, 211.2, 241, 290.2, 292

[56] References Cited

U.S. PATENT DOCUMENTS

| 4,622,237 | 11/1986 | Lori | 427/446 |
|---|---|---|---|
| 4,652,489 | 3/1987 | Crass et al. | 428/337 |
| 4,698,261 | 10/1987 | Bothe et al. | 428/204 |
| 5,026,592 | 6/1991 | Janocha et al. | 428/204 |
| 5,049,436 | 9/1991 | Morgan et al. | 428/213 |
| 5,254,394 | 10/1993 | Bothe et al. | 428/212 |

FOREIGN PATENT DOCUMENTS

| 0 220 619 | 5/1987 | European Pat. Off. . |
|---|---|---|
| 0 236 945 | 9/1987 | European Pat. Off. . |
| 0 247 898 | 12/1987 | European Pat. Off. . |
| 0 302 424 | 2/1989 | European Pat. Off. . |
| 0 336 127 | 10/1989 | European Pat. Off. . |
| 0 336 128 | 10/1989 | European Pat. Off. . |
| 0 411 968 | 2/1991 | European Pat. Off. . |
| 0 444 339 | 9/1991 | European Pat. Off. . |
| 0 475 110 | 3/1992 | European Pat. Off. . |
| 0 484 817 | 5/1992 | European Pat. Off. . |
| 24 23 423 | 11/1975 | Germany . |
| 3 401 218 | 7/1985 | Germany . |
| 2 201 407 | 9/1988 | United Kingdom . |

*Primary Examiner*—Leszek Kiliman
*Attorney, Agent, or Firm*—Foley & Lardner

[57] ABSTRACT

A composite film is described which has at least one base layer which predominantly comprises polypropylene, and at least one top layer. The top layer is sealable and comprises a homopolymer of an olefin. A process for producing the composite film, the top layer olefin homopolymer and packaging material made from the film also are described.

17 Claims, No Drawings ns provide
SEALABLE COMPOSITE POLYPROPYLENE FILM AND PROCESSES FOR PRODUCING AND USING IT This application of a division, of application Ser. No. 08/107,978, filed Aug. 18, 1993 now U.S. Pat. No. 5,529,843.

BACKGROUND OF THE INVENTION

1. Field of the Invention

The invention relates to a composite film having at least one base layer which predominantly comprises polypropylene, and at least one top layer.

The invention also relates to a process for producing the composite film and to its use as a packaging material.

2. Description of Related Art

Polypropylene films composed of a polypropylene base layer and polypropylene top layers are known in the art. These films typically are characterized as having very good optical properties and good scratch resistance. However, they cannot be processed on automatic packaging machines since they have very poor sealing properties. For sealing, such high temperatures must be applied that pronounced shrinkage occurs in the sealing zone and the packages produced in this manner are not acceptable. Moreover, the imprinting properties and coating properties of oriented polypropylene films require improvement. Although surface treatment of the films (e.g., corona treatment or flame treatment) improves these properties, this improvement frequently decays rapidly with time and storage, or is inadequate.

To eliminate these disadvantages, oriented polypropylene films usually are provided with sealing layers composed of random copolymers or terpolymers of propylene and other α-olefins, polyethylene or corresponding polymer blends. However, such sealing layers or layers cause a drastic deterioration in the optical properties and, in particular, the gloss is markedly reduced and the opacity increases to an undesired degree. Moreover, sealing properties of the copolymer and terpolymer top layers require improvement.

Coating polypropylene films with dispersions comprising polyvinylidene chloride or various polyacrylates also has been proposed. Although this process also generates sealable films, these films are expensive and have the disadvantage that they cannot be regenerated because the cutting material produced during the film manufacture cannot be recycled due to the coating applied thereto. For economic and ecological reasons, this disadvantage renders these films unacceptable.

EP-A-0,484,817 describes a propylene film with top layers of syndiotactic polypropylene. These films are said to show a balanced property spectrum, in particular good sealing properties and good optical properties, but problems accumulate during stretching of this material. These problems are due to cracking in the syndiotactic top layers or due to delamination of the top layers from the isotactic core layer. The above-mentioned problems are caused, on the one hand, by the poorer stretchability of syndiotactic polypropylene and, on the other hand, by the lower compatibility of syndiotactic and isotactic polypropylene.

SUMMARY OF THE INVENTION

It is therefore an object of the present invention to avoid the disadvantages of the films previously described. In particular, it is an object of the present invention to provide a composite film which is distinguished by good optical properties, in particular by good gloss and low opacity, and by good sealing properties. It is an additional object of the invention to provide a film which has an imprintable surface and a high surface tension which is stable over long storage periods and does not fall below 36 mN/m even after more than two months.

It also is an object of the invention to provide a process for producing such a composite film. It is an additional object of the invention to provide a sealable top layer which has an isotacticity according to $^{13}$C-NMR within the range of 80 to 99%, an n-heptane-soluble fraction of less than 5%, a mean isotactic block length $n_{iso}$ within the range of 10 to 140, a mean molecular mass $M_w$ within the range of $5\times10^4$ to $2\times10^6$, an inhomogeneity of the molecular mass $M_w/M_n$ of less than 5, a melting point according to DSC within the range of 115 to 160° C., a melt flow index MFI according to DIN 53 735 measured at 230° C. and 50N within the range of 0.1 to 1000 g/10 minutes and a viscosity number VN within the range of 70 to 2000 cm$^3$/g.

In achieving these and other readily apparent objects of the invention, there is provided a composite film having at least one base layer made predominantly from polypropylene and a top layer which is sealable and comprises an isotactic homopolymer of an olefin. The foregoing objects of the invention also are achieved by providing a sealable top layer for use in a multi-layer composite film made from a film-forming olefin homopolymer.

Other objects of the invention also are achieved by providing a process for producing a composite film including first co-extruding melts of the homopolymer polypropylene base layer and the olefin homopolymer top layer through a die and then cooling the coextruded film. The film then is biaxially stretched at a longitudinal stretching ratio of 4:1 to 7:1 and at a transverse ratio of 6:1 to 11:1. The stretched film then is heat-set and corona discharged, if appropriate. The resulting film then is wound up by drawing off the co-extruded film via a draw-off roller having a temperature of between 10 and 90° C. Objects of the invention also are achieved by providing a packaging material made from these films.

These and other objectives of the invention will be readily apparent by reference to the following detailed description of the preferred embodiments of the invention.

DETAILED DESCRIPTION OF THE PREFERRED EMBODIMENTS

Depending on its intended use, the composite films of the invention can be transparent, dull, opaque, white or white-opaque.

The base layer of the composite film according to the invention comprises a propylene polymer and, if appropriate, further added additives each in effective quantities. Usually, the base layer predominantly comprises polypropylene. Throughout this description, "predominantly comprises" denotes an amount of at least 50% by weight, and preferably at least 75% by weight of polypropylene. It is preferred that the base layer "consists essentially of" a propylene polymer. The phrase "consisting essentially of" denotes a base layer made of a polymer of propylene and minor amounts of other components which do not affect the physical characteristics of the propylene polymer. Throughout this description, "effective quantity" is meant to include an amount sufficient to bring about the desired effect (i.e., antistatic effect for antistatic agents, stabilizing effect for stabilizers, etc.).

Any polypropylene known in the art can be use in the base layer of the present invention. The propylene polymer of the invention usually comprises a predominant part (at least 90%) of propylene and preferably has a melting point of 120° C. or higher, preferably 150 to 170° C. Preferred propylene polymers useful as the base layer are isotactic propylene homopolymers having an a tactic fraction of 15% by weight or less, relative to the isotactic propylene homopolymer, copolymers of ethylene and propylene having an ethylene content of 10% by weight or less, copolymers of propylene with $C_4$–$C_8$-α-olefins having an a-olefin content of 10% by weight or less and terpolymers of propylene, ethylene and butylene having an ethylene content of 10% by weight or less and a butylene content of 15% by weight or less. A particularly preferred propylene polymers is isotactic propylene homopolymer.

The percentages listed above by weight relate to the particular copolymer or terpolymer. The propylene polymer of the base layer usually has a melt flow index of 0.5 g/10 minutes to 8 g/10 minutes, preferably 2 g/10 minutes to 5 g/10 minutes, measured at 230° C. and a force of 21.6N in accordance with the procedures set forth in DIN 53 735.

Furthermore, a mixture of these propylene homopolymers and/or copolymers and/or terpolymers and/or other polyolefins, in particular of monomers having 2 to 6 carbon atoms, is useful in the base layer of the composite films of the invention. Such a polymer mixture usually comprises at least 50% by weight, in particular at least 75% by weight, of propylene polymer. Suitable other polyolefins in the polymer mixture include polyethylene, in particular high density polyethylene (HDPE), low density polyethylene (LDPE) and LLDPE, the fraction of these polyolefins generally not exceeding 15% by weight in each case, relative to the polymer mixture.

The base layer can additionally comprise up to 40% by weight, preferably up to 30% by weight, relative to the total weight of the base layer, of inert particulate material. The particles generally have a mean particle diameter in the range from 0.01 to 8 μm, preferably from 0.02 to 2.5 μm. These inert particles typically are used for the manufacture of opaque, white or white-opaque composite films. The presence of these inert particulate material has the effect that, during the stretch orientation of the film at suitable temperatures, microcracks and microcavities, so-called voids, in the region of which visible light is refracted, are formed between the polymer matrix and the inert material. This imparts an opaque appearance to the film, which makes the film particularly suitable for certain packaging purposes, in particular in the foodstuffs sector.

The inert particulate material can be of an inorganic or organic nature. Any particles having the above characteristics can be used. Inorganic materials include calcium carbonate, aluminum silicate, silica or titanium dioxide, and the organic materials include polyethylene terephthalate, polybutylene terephthalate, polyesters, polyamides and polystyrenes. It also is possible to combine different inorganic and/or organic particles in accordance with the present invention.

The modification of the base layer with particles in the manner indicated above is known in the art and described in, for example, German Patent Application P 4,315,006.3, DE-A-3,401,218, EP-A-0,180,087, EP-A-0,187,253, EP-A-0,220,619 and EP-A-0,475,110, which are each incorporated herein by reference in their entirety. The types of particles, the quantity used thereof, modification by coating, etc., are described in detail in these publications.

The core layer also can comprise resins and/or antistatics as a preferred embodiment.

The composite film according to the invention also can comprise one or more further interlayers applied between the base layer and the top layer. The interlayer or interlayers which may be present also predominantly comprise propylene polymers or polypropylene mixtures such as those described above for the base layer. In principle, the base layer and the interlayer(s) can be comprised of identical or different propylene polymers or mixtures.

The melt flow indices (MFI) of the polymers for the core layer and interlayer(s) should be as high as possible. If appropriate, the MFI of the interlayer(s) can be somewhat higher, but should not exceed the MFI of the base layer by a difference of 20%.

In a further embodiment of the invention, the propylene polymers used in the base layer and/or interlayer are partially degraded by the addition of organic peroxides. A measure of the degree of degradation of the polymer is the degradation factor A, which indicates the relative change in the melt index of the polypropylene according to DIN 53 735, relative to the starting polymer.

$$A = \frac{MFI_2}{MFI_1}$$

$MFI_1$=Melt flow index of propylene polymers before the addition of organic peroxide $MFI_2$=Melt flow index of the propylene polymer degraded by a peroxide mechanism In accordance with the invention, the degradation factor A of the propylene polymer usually is in a range from 3 to 15, and preferably 6 to 10.

Any peroxides can be used to degrade the polymers. Dialkyl peroxides are particularly preferred as organic peroxides, the alkyl radical to be understood as a typical saturated straight-chain or branched lower alkyl radical having up to six carbon atoms. 2,5-Dimethyl-2,5-di(t-butylperoxy)-hexane or di-t-butyl peroxide are particularly preferred.

The top layer of the composite film of the present invention comprises an isotactic olefin homopolymer which, as an isotactic homopolymer, exhibits completely surprising outstanding sealing properties. Thus, it is possible to provide a sealable top layer material composed of an isotactic olefinic homopolymer.

Throughout this description, the phrase "isotactic olefinic homopolymers" denotes polymers comprised of one type of monomers. In accordance with this invention the term "homopolymers" also covers those polymers which are predominantly composed of one type of monomer, but still also comprise a small fraction of other comonomers. The fraction of other comonomers used in the isotactic olefinic homopolymers of the present invention is so small that the essential properties of the homopolymer are not affected.

These isotactic olefinic homopolymers are produced by polymerization of an olefin of the formula $R^a$—CH═CH—$R^b$, wherein $R^a$ and $R^b$ can be identical or different and are hydrogen or a hydrocarbon radical having 1 to 14 carbon atoms, or $R^a$ and $R^b$ can form a ring together with the atoms linking them. The polymerization is carried out in the presence of a catalyst made of a metallocene and a co-catalyst. Methods of producing these polyolefins are well known in the art and described in, for example, EP-A-0, 302,424, EP-A-0,336,128 and EP-A-0,336,127, which are incorporated herein by reference in their entirety.

Sealable propylene homopolymers having a propylene content from 96 to 100% by weight, preferably 98 to 99.99% by weight, are particularly advantageous.

It has been found, completely unexpectedly, that these homopolymers of olefins such as propylene show very good sealing properties. This result was indeed surprising, since hitherto known isotactic homopolymers of propylene are, to some degree, not sealable.

The homopolymers suitable for use in forming the top layers of the composite film of the present invention are highly isotactic. The defined a tactic fraction usually is below 5%, in some cases even below 1%. The isotaxy of the homopolymers, determined by means of $^{13}$C-NMR, is at least more than 70%, especially more than 80%, and preferably in the range from 88 to 98%. Those skilled in the art are familiar with the methods used in $^{13}$C-NMR, and are capable of determining the isotaxy of homopolymers using this method.

While not intending to be bound by any theory, it is believed that these polymers have a completely novel structure which causes the unusual properties. This belief is supported by results which were found in determining the parameters suitable for characterization. The individual ranges of values or preferred ranges of the parameters suitable for characterizing the sealable homopolymer of the invention are compiled in Table 1:

TABLE 1

| Characteristic of Polymer | Range | Preferred range | Particularly preferred range |
| --- | --- | --- | --- |
| Isotacticity according to $^{13}$C-NMR | 80–99% | 88–98% | 90–97% |
| Mean isotactic block length $n_{iso}$ | 10–140 | 15–80 | 20–50 |
| Mean molecular mass $M_w$(g/mol) | $5 \times 10^4$– $2 \times 10^6$ | $1 \times 10^5$– $1 \times 10^6$ | $1.5 \times 10^5$– $5 \times 10^5$ |
| Inhomogeneity of the molecular mass $M_w/M_n$ | <5 | <4 | <3.2 |
| Melting point according to DSC | 115–160° C. | 125–150° C. | 135–145° C. |
| Melt flow index MFI according to DIN 53 735 (230° C., 50 N) | 0.1–1000 g/10 min | 1–100 g/10 min | 2–50 g/10 min |
| Viscosity number VN | 70–2000 cm³/g | 100–1000 cm³/g | 150–750 cm³/g |

Determining the characteristics of the polymer of the present invention in accordance with the methods described in Table 1 above are within the routine skill of those skilled in the art. The sealable homopolymers are advantageously characterized by referring to at least two of the parameters mentioned above (in the Table), for example by the melting point and one further parameter or by the isotaxy and one further parameter. It also is advantageous to refer to the melting point and mean isotactic block length or the melting point and isotaxy or isotaxy and mean isotactic block length or isotaxy and mean molecular mass or isotaxy and inhomogeneity of the molecular mass. A melting point of the isotactic olefin homopolymer of the present invention within the range of 120 to 155° C., and a mean isotactic block length $n_{iso}$ within the range of 15 to 140 are particularly preferred.

The film according to the invention is at least two-layer having a base layer and at least one top layer according to the invention and, if desired, additional interlayers arranged between the base layer and top layer. The selection of the number of layers depends on the intended use, three-layer, four-layer and five-layer embodiments being particularly preferred.

The total thickness of the film can vary within wide limits and depends on the intended use. The preferred thickness of the composite film according to the invention is from 10 to 120 μm, more preferably 20 to 80 μm, and most preferably 30 to 60 μm.

The thickness of the interlayer(s) which may be present is in each case, independently of one another, 2 to 12 μm. Preferably, the individual interlayer(s) thickness is from 3 to 8 μm, and most preferably from 3 to 6 μm. The thicknesses stated above relate in each case to one interlayer.

The thickness of the top layer according to the invention can be selected independently of other layers and is usually within the range from 0.3 to 10 μm, preferably 0.4 to 2.5 μm and more preferably 0.5 to 2 μm.

The thickness of the base layer results correspondingly from the difference between the total thickness and the sum of the thickness of the applied top layer and the interlayer(s). The thickness of the base layer therefore can vary within wide limits analogously to the total thickness.

In order to improve certain properties of the polypropylene film according to the invention even further, the base layer, the interlayer(s) and top layer (layers) can comprise additives each in an effective quantity. Then additives can include one or more hydrocarbon resins, antistatics antiblocking agents, lubricants, stabilizers or neutralizing agents which are compatible with the polymers of the core layer and top layer (layers). All the statements of quantities in the following description are in percent by weight (% by weight) relative to the respective layer or layers to which the additive may have been added.

Usually, a low-molecular resin can be added to the base layer (layers) and/or interlayer(s), in an amount which is generally in the range from 1 to 30% by weight, preferably 2 to 10% by weight. The softening point of the resin is usually between 100 and 180° C. (measured according to DIN 1995-U4, which corresponds to ASTM E-28), and preferably is between 120° C. and 160° C. Amongst the numerous low-molecular resins known in the art, hydrocarbon resins are preferred. Hydrocarbon resin in the form of petroleum resins, styrene resins, cyclopentadiene resins and terpene resins (these resins are described in Ullmanns Encyklopadie der techn. Chemie [Ullmann's Encyclopedia of Industrial Chemistry], 4th edition, volume 12, pages 525 to 555) are particularly preferred.

Petroleum resins include hydrocarbon resins which are produced by polymerization of highly decomposed crude oil materials in the presence of a catalyst. These crude oil materials usually comprise a mixture of resin-forming substances such as styrene, methylstyrene, vinyltoluene, indene, methylindene, butadiene, isoprene, piperylene and pentylene. The styrene resins can be low-molecular homopolymers of styrene or copolymers of styrene with other monomers such as methylstyrene, vinyltoluene and butadiene. Cyclopentadiene resins include cyclopentadiene homopolymers or cyclopentadiene copolymers which are obtained from coal tar distillates and separated crude oil gas. These resins are produced by holding the materials, which comprise cyclopentadiene, at an elevated temperature for a prolonged period of time. Dimers, trimers or oligomers can be obtained depending on the reaction temperature. Those skilled in the art are familiar with the techniques employed in fabricating these cyclopentadiene resins.

The terpene resins useful in the invention include polymers of terpenes, i.e., hydrocarbons of the formula $C_{10}H_{16}$, which are present in almost all essential oils or oil-comprising resins from plants as well as phenol-modified terpene resins. Specific examples of terpenes which are useful in the invention are pinene, α-pinene, dipentene, limonene, myrcene, camphene and similar terpenes.

The hydrocarbon resins also can be modified hydrocarbon resins. The modification is effected in general by reacting the raw materials before the polymerization, by introducing special monomers or by reacting the polymerized product. Preferably hydro-genations or partial hydrogenations are carried out to modify the hydrocarbon resins.

In addition, styrene homopolymers, styrene copolymers, cyclopentadienehomopolymers, cyclopentadiene copolymers and/or terpene polymers each having a softening point of above 135° C. can be used as the hydrocarbon resins (in the case of the unsaturated polymers, the hydrogenated product is preferred). The cyclopentadiene polymers having a softening point of 140° C. and higher are particularly preferred in the interlayers.

Any desired antistatic can be used in an antistatic effective amount. Preferred antistatics useful in the invention include alkali metal alkanesulfonates, polyether modified, i.e., ethoxylated and/or propoxylated polydiorganosiloxanes (polydialkylsiloxanes, polyalkyl-phenylsiloxanes and the like) and/or substantially straight-chain and saturated aliphatic tertiary amines which have an aliphatic radical having 10 to 20 carbon atoms and are substituted by ω-hydroxy-($C_1$–$C_4$)-alkyl groups, N,N-bis-(2-hydroxyethyl)-alkylamines having 10 to 20 carbon atoms preferably 12 to 18 carbon atoms in the alkyl radical. The effective quantity of antistatic is generally in the range from 0.05 to 0.3% by weight.

Any desired lubricants can be used in a lubricating effective amount. Lubricants useful in the invention can include higher aliphatic acid amides, higher aliphatic acid esters, waxes and metal soaps as well as polydimethylsiloxanes. The effective quantity of lubricant usually is in the range from 0.1 to 3% by weight. The addition of higher aliphatic acid amides in the range from 0.15 to 0.25% by weight in the base layer and/or the top layers is particularly suitable. A particularly suitable aliphatic acid amide is erucic acid amide. The addition of polydimethylsiloxanes in the range from 0.3 to 2.0% by weight also is preferred, in particular polydimethylsiloxanes having a viscosity from 10,000 to 1,000,000 $mm^2/s$.

The stabilizers useful in the invention can be the conventional compounds having a stabilizing action for ethylene polymers, propylene polymers and other α-olefin polymers. The added quantity thereof usually is between 0.05 and 2% by weight. Phenolic stabilizers, alkali metal stearates/alkaline earth metal stearates and/or alkali metal carbonates/alkaline earth metal carbonates are particularly suitable.

Phenolic stabilizers in a quantity from 0.1 to 0.6% by weight, especially 0.15 to 0.3% by weight, and with a molecular mass of more than 500 g/mol are preferred. Pentaerythrityl tetrakis-3-(3,5-di-tertiary butyl-4-hydroxyphenyl)-propionate or 1,3,5-trimethyl-2,4,6-tris(3,5-di-tertiary butyl-4-hydroxybenzyl)benzene are particularly advantageous for use in the present invention.

Any antiblocking agents known in the art can be used in an antiblocking effective amount. Suitable antiblocking agents useful in the invention include inorganic additives such as silica, calcium carbonate, magnesium silicate, aluminum silicate, calcium phosphate and the like and/or incompatible organic polymers such as polyamides, polyesters, polycarbonates and the like. Preferred antiblocking agents include benzoguanamine/formaldehyde polymers, silica and calcium carbonate usually. The effective quantity of antiblocking agent is generally in the range from 0.1 to 2% by weight, preferably 0.1 to 0.5% by weight.

The mean particle size usually is between 1 and 6 µm, in particular 2 and 5 µm, particles having a spherical shape, as described in EP-A-0,236, 945 and DE-A-3,801,535, being particularly suitable.

Neutralizing agents useful in the invention preferably are calcium stearate and/or calcium carbonate having a mean particle size of at most 0.7 µm, an absolute particle size of less than 10 µm and a specific surface area of at least 40 $m^2/g$.

The invention also relates to a process for producing the composite film according to the invention using co-extrusion processes. Within the scope of this process, melts corresponding to the individual layers of the film are co-extruded through a flat die and the film thus obtained is drawn off on one or more roller(s) for solidification. The film then is biaxially stretched (oriented), if desired. The film, biaxially stretched if appropriate, then is heat-set and, if desired, flame-treated appropriately on the surface of the layer intended for corona treatment.

Biaxial stretching (orientation) is preferred and can be carried out simultaneously or successively. Successive biaxial stretching includes stretching first carried out longitudinally (in the machine direction) and then transversely (perpendicular to the machine direction), and is particularly advantageous.

In accordance with the method of the invention, the polymer or the polymer mixture of the individual layers initially is compressed and liquified in an extruder, as is typical in a co-extrusion process, and the optional additives can already be present in the polymer mixture. The melts then are simultaneously forced through a flat die (slot die), and the extruded composite film is drawn off on one or more draw-off rollers, during which it cools and solidifies.

Preferably, the film thus obtained is then stretched longitudinally and transversely to the direction of extrusion, which leads to an orientation of the molecule chains. The stretching in the longitudinal direction is preferably 4:1 to 7:1, and preferably 6:1 to 11:1 in the transverse direction, more preferably 8:1 to 10:1 in the transverse direction. The longitudinal stretching usually is carried out by using two rollers running at different speeds corresponding to the desired stretching ratio, and the transverse stretching usually is carried out by an appropriate tenter frame.

The biaxial stretching of the film preferably is followed by heat-setting where the film is preferably held for about 0.5 to 10 seconds at a preferred temperature of 110 to 130° C. The film then is wound up in the usual manner by a winding device.

It has proved to be particularly advantageous to hold the draw-off roller or rollers, by which the extruded film is also cooled and solidified, at a temperature from 10 to 90° C., preferably 20 to 60° C.

Furthermore, the longitudinal stretching is advantageously carried-out at a temperature of less than 140° C., preferably in the range from 125 to 135° C., and the transverse stretching is carried out at a temperature above 140° C., preferably at 145 to 160° C.

If appropriate, one or both surfaces of the film can, as mentioned above, be corona-treated or flame-treated according to one of the known methods after the biaxial stretching. Flame-treating can be accomplished by applying a direct electric voltage between a burner (negative pole) and a cooling roller for a flame treatment with a polarized flame. This treatment is described, for example in U.S. Pat. No. 4,622,237, herein incorporated by reference in its entirety. The level of the applied voltage can be between 500 and 3000 V, preferably in the range from 1500 to 2000 V. Owing to the applied voltage, the ionized atoms are provided with increased acceleration and impinge at higher kinetic energy on the polymer surface. The chemical bonds within the polymer molecule are more readily broken, and the formation of free radicals proceeds more rapidly. The thermal stress on the polymer is in this case far less than in standard flame treatment, and films can be obtained in which the sealing properties of the treated side are even better than those of the untreated side.

For the alternative corona treatment, the film can be passed between two conductor elements serving as electrodes. A high voltage, in most cases alternating voltage at about 10,000 V and 10,000 Hz, is applied between the electrodes so that spray discharges or corona discharges take place. Due to the spray discharge or corona discharge, the air above the film surface is ionized and reacts with the molecules of the film surface, so that polar spots are formed in the essentially non-polar polymer matrix. The treatment intensities are within the usual range, with a scope of 38 to 45 mN/m being preferred.

The composite film according to the invention is distinguished by very good sealing properties, in particular by a low start temperature of sealing and by good sealing seam strength. At the same time, the novel top layer makes high gloss values possible, such as have hitherto been known only for non-sealable homopolymers. The disadvantageous opacity typically caused by coating with conventional sealable copolymers or terpolymers is avoided more advantageously, unless an opaque embodiment is used. The novel top layer material allows sealable films of high gloss and high transparency to be produced, and the known disadvantages of the conventional top layer materials composed of copolymers or terpolymers are avoided (high price, impairment of gloss and transparency, process engineering aspects, etc.).

The invention now will be explained by reference to the following examples which exemplify preferred embodiments.

EXAMPLE 1

By co-extrusion and subsequent stepwise orientation in the longitudinal and transverse directions, a three-layer biaxially oriented polypropylene (boPP) film having a total thickness of 20 µm and an ABA layer structure was produced, i.e., the base layer B was surrounded on both sides by two top layers of type A. Before rolling up, the film was corona-treated on the side of the draw-off roller at a dose power of 15 Wmin/m². On this side, the surface tension was 46 mN/m due to the corona treatment.

For stabilization, all layers comprised 0.12% by weight of pentaerythrityl tetrakis-4-(3,5-ditertiary butyl-4-hydroxyphenyl)-propionate (®Irganox 1010) and 0.06% by weight of calcium stearate as a neutralizing agent.

The base layer was made essentially from a propylene homopolymer having an n-heptane-soluble fraction of 3.5% by weight and a melting point of 162° C. The melt flow index of the propylene homopolymer was 3.6 g/10 minutes at 230° C. and 21.6N load (DIN 53 735).

The polyolefinic top layers A (Table 2) were made essentially from an isotactic propylene homopolymer having a melting point (DSC) of 136° C. The isotaxy index, determined by $^{13}$C-NMR, of the homopolymer A was 93.2%. From the $^{13}$C-NMR spectrum, it was possible to determine a mean isotactic block length of 27 monomer units by means of the equation.

$$n_{iso} = 1 + \frac{2 I_{mm}}{I_{mr}}$$

The melt flow index of this homopolymeric sealing raw material was 30 g/10 minutes, measured at 230° C. and 50N load (DIN 53 735). The top layer A comprised 0.3% by weight of silica antiblocking agent having a mean particle diameter of 4 µm. The thickness of the top layers A was 0.8 µm.

Comparison Example 1

Example 1 was repeated with the following modifications. The polyolefinic top layers A were made essentially from a random copolymer having a $C_2$-content of 3 to 4% by weight with the remainder propylene and a melting point of 135° C. The melt flow index of the copolymeric sealing raw material A was 25 g/10 minutes, measured at 230° C. and 50N load (DIN 53 735). Analogously to Example 1, the random copolymer also comprised 0.3% by weight of the silica antiblocking agent having a mean particle diameter of 4 µm. The thickness of each of the top layers was 0.9 µm.

Comparison Example 2

Example 1 was repeated with the following modifications. The polyolefinic top layers A were made essentially from a random $C_2$–$C_3$–$C_4$-terpolymer ($C_2$-content 1.5 to 2.5% by weight, $C_4$- content 7 to 10% by weight) having a melting point of about 133° C. The melt flow index of the terpolymeric sealing raw material A was 22 g/10 minutes, measured at 230° C. and 50N load (DIN 53 735). Analogously to Comparison Example 1, the random terpolymer comprised 0.3% by weight of the silica antiblocking agent having a mean particle diameter of 0.4 µm. The thickness of each of the top layers was 0.9 µm.

The following measurement methods were used for characterizing the raw materials and the films. These techniques all are well known to those skilled in the art.

The film properties and film compositions are summarized in Tables 2, 3 and 4 below.

Mean molecular weight and inhomogeneity of the molecular mass

The mean molecular mass and the mean inhomogeneity of the molecular mass were determined analogously to DIN 55 672, part 1, by means of gel permeation chromatography. In the present invention, ortho-dichlorobenzene was used as the eluant place of THF. Since the olefinic polymers to be examined are not soluble at room temperature, the entire measurement was carried out at an elevated temperature (~135° C.).

Viscosity number

The viscosity number was determined according to DIN 53 728, sheet 4.

Melt flow index

The melt flow index was measured in accordance with the procedures of DIN 53 735, at 21.6 or 50N load and 230° C.

Melting point

The melting point was determined using DSC measurement, maximum of the melting curve, heating rate 20° C./minute.

Opacity

The opacity of the film was measured in accordance with the procedures of ASTM-D 1003-52.

Gloss

The gloss was determined according to DIN 67 530. The reflector value was measured as an optical characteristic of the surface of a film. Analogously to the standards ASTM-D 523-78 and ISO 2813, the angle of incidence was set to 20° or 60°. Under the set angle of incidence, a light beam strikes the plane test surface and is reflected or scattered by the latter. The light beams incident on the photo-electronic receiver are indicated as a proportional electric value. The measured value is dimensionless and must be quoted with the angle of incidence.

Sealing seam strength

For the determination, two 15 mm wide film strips were superposed and sealed at 130° C., a sealing time of 0.5 seconds and a sealing pressure of 10N/mm² (apparatus: Brugger type NDS, sealing jaw heated on one side). The sealing seam strength was determined by the T-Peel method.

Surface tension

The surface tension was determined by means of the ink method (DIN 53 364).

The following tables summarize the aforementioned properties for the composite film of Example 1, and the composite films of Comparative Examples 1 and 2.

Isotacticity

The isotacticity of the homopolymers is determined by means of their $^{13}$C-NMR spectrum by comparing the intensity of the signals resulting from methyl groups with different surroundings. The $^{13}$C-NMR spectrum of a homopolymer essentially provides three groups of signals, so-called "triades".

1. The "mm-triade" appears at a chemical shift in the range of 21 to 22 ppm and relates to these methyl groups having immediately neighbouring methyl groups on their left and right sides ( ⌐ ).

2. The "mr-triade" appears at a chemical shift in the range of about 20,2 to 21 ppm and relates to those methyl groups having immediately neighbouring methyl groups either on their left or on their right sides ( ⌐ ).

3. The "rr-triade" appears at a chemical shift in the range of 19,3 to 20 ppm and relates to those methyl groups having no immediately neighbouring methyl groups ( ⌐ ).

The intensity "I" of the signals is determined by their integral. The isotactivity is defined as follows:

$$\eta_{iso} = 1 + \frac{2\, I_{mm}}{I_{mm}}$$

wherein Imm, Imr and Irr are the integrals of the respective signal groups.*

Preparation of the Samples and Measurement 60 to 100 mg of polypropylene are metered into 10 mm a NMR-tube and a mixture of hexachlorobutadiene and tetrachloroethane in a mixing ratio of about 1,5:1 is added until the filling height is about 45 mm. The suspension is kept at a temperature of 140° C. until a homogeneous solution results (about 1 hour). The dissolution process is accelerated by stirring the mixture from time to time. The $^{13}$C-NMR spectrum is recorded at an elevated temperature (about 365 k) and standard measurement conditions.

Mean Isotactic Block Length

The mean isotactic block length is also derived from the $^{13}$C-NMR spectrum of the homopolymer. Said block length is defined as follows $$I = \frac{I_{mm} + 0.5\, I_{mr}}{I_{mm} + I_{mr} + I_{rr}} \cdot 100$$

wherein Imm and Imr are the integrals of the respective signal groups.

TABLE 2

|  | Comparison Example 1 | Comparison Example 2 | Example |
|---|---|---|---|
| Opacity (Gardner) | 2.2–2.5 | 1.9–2.2 | 1.5–1.8 |
| Gloss (20°) | 115 | 125 | 135 |
| Minimum sealing temperature MST (without corona treatment) [°C.] | 117 | 107 | 118 |
| Minimum sealing temperature MST (with corona treatment 1.5 kW) [°C.] | 120 | 118 | 118 |
| Surface tension 15 Wmin/m² treatment dose, measured after storage for 1 week [mN/m] | 44 | 41 | 45 |
| Film thickness [μm] | 20 | 20 | 20 |

TABLE 3

| Example | Comparison Example 2 | Comparison Example 1 |
|---|---|---|
| Base layer B: Isotactic polypropylene Top layers A: | Base layer B: Polypropylene Top layers A: | Base layer B: Polypropylene Top layers A: |
| Isotactic propylene homopolymer: Isotacticity according to $^{13}$C-NMR [%]: 93.2 | Random ethylene/propylene copolymer | Random ethylene/propylene/butylene terpolymer |
| Mean isotactic block length $n_{iso}$:27 | $C_2$-content: 3–4% | $C_2$-content: 1.5–2.5% |
| Mean molecular mass $M_w$ [g/mol]: 2.1 × 10⁵ | 2.4 × 10⁵ | $C_4$-content: 7–10% |
| Inhomogeneity of the molecular mass $M_w/M_n$: 2.0 | 3.5 | 2.3 × 10⁵ 2.8 |
| Melting point according to DSC [°C.]: 136 | 133 | 135 |
| Melt index MFI (230° C., 50N) according to DIN 53 735 [g/10 minutes]: 30 | 22 |  |
| Viscosity number VN [cm³/g]: 173 | 245 | 25 210 |
| Film structure ABA | Film structure ABA | Film structure ABA |

TABLE 3-continued

| Example | Comparison Example 2 | Comparison Example 1 |
|---|---|---|
| Film thickness: 20 µm | Film thickness: 20 µm | Film thickness: 20 µm |
| Top layer thickness: 0.8 µm | Top layer thickness: 0.9 µm | Top layer thickness 0.9 µm |

Time dependence of the surface tension (mN/m) of corona-treated 3-layer films with top layers of comparison Example 1, Comparison Example 2 and the Example.

TABLE 4

|  | 1st W. | 2nd W. | 4th W. | 5th W. | 6th W. | 7th W. |
|---|---|---|---|---|---|---|
| VB 1 | 44 | 40 | 38 | 37 | 35 | 35 |
| VB 2 | 41 | 38 | 37 | 35 | 35 | 34 |
| Example | 45 | 42 | 39 | 36 | 36 | 36 |

Corona dose: 15 Wmin/m²
W= Week
VB= Comparison Example

As can be seen from these examples, composite films made in accordance with the present invention exhibit high gloss and low opacity, and also have a high surface tension which is stable over long storage periods.

While the invention has been described in detail with reference to particularly preferred embodiments, those skilled in the art will appreciate that various modifications can be made without departing from the spirit and scope of the invention.

What is claimed is:

1. A process for producing a composite film having a base layer comprising at least 50% by weight of polypropylene, and a sealable top layer comprising an isotactic homopolymer of polypropylene having a propylene content of from 98 to 100% by weight and having an isotacticity of at least 70% as measured by $^{13}$C-NMR, said process comprising the steps of:
   (a) coextruding melts of polypropylene and an isotactic homopolymer of an olefin through a flat die to produce individual layers of said composite film, wherein the base layer comprises polypropylene and the sealable top layer comprises an isotactic homopolymer of polypropylene;
   (b) cooling the co-extruded film for solidification;
   (c) biaxially stretching the film at a longitudinal stretching ratio of 4:1 to 7:1 and a transverse stretching ratio of 6:1 to 11:1;
   (d) heat-setting the biaxially stretched film;
   (e) optionally corona-treating the biaxially stretched film; and
   (f) winding up the resulting composite film by drawing off with a draw-off roller having a temperature of between 10 and 90° C.

2. The method as claimed in claim 1, wherein the base layer further comprises at least one additive selected from the group consisting of hydrocarbon resins, antistatic agents, antiblocking agents, lubricants, stabilizers and neutralizing agents.

3. The method as claimed in claim 1, wherein said base layer consists essentially of (i) at least 50% by weight of polypropylene, relative to the total weight of said base layer, and (ii) up to 40% by weight of inert particulate material, relative to the total weight of said base layer.

4. The method as claimed in claim 3, wherein said composite film is opaque, white or white opaque.

5. The method as claimed in claim 1, wherein the isotacticity of the olefin homopolymer of the top layer is at least 80% and the mean isotactic block length $n_{iso}$ of the olefin homopolymer of the top layer is between 10 and 140.

6. The method as claimed in claim 1, wherein the mean molecular mass $M_w$ of the olefin homopolymer of the top layer is in the range from $5 \times 10^4$ to $2 \times 10^6$ g/mol.

7. The method as claimed in claim 1, wherein the inhomogeneity of the molecular mass $M_w/M_n$ of the olefin homopolymer of the top layer is less than 5.

8. The method as claimed in claim 1, wherein the melting point according to DSC of the olefin homopolymer of the top layer is 150 to 160° C.

9. The method as claimed in claim 7, wherein the melt flow index MFI according to DIN 53 735 of the olefin homopolymer of the top layer is within the range from 0.1 to 1000 g/10 minutes measured at 230° C. and 50N.

10. The method as claimed in claim 1, wherein the viscosity number VN of the olefin homopolymer of the top layer is in the range of from 70 to 2000 cm³/g.

11. The method as claimed in claim 1, wherein said polypropylene comprises at least 90% of propylene and has a melt flow index of 0.5 g/10 minutes to 8 g/10 minutes according to DIN 53 735, and a melting point from 150 to 170° C.

12. A process for producing a composite film having a base layer comprising at least 50% by weight of polypropylene, and a sealable top layer comprising an isotactic homopolymer of an olefin having an atactic fraction lower than 5%, said process comprising the steps of:
   (a) coextruding melts of polypropylene and said isotactic homopolymer of an olefin corresponding to individual layers of said composite film through a flat die, wherein the base layer comprises polypropylene and the sealable top layer comprises an isotactic homopolymer of olefin;
   (b) cooling the co-extruded film for solidification;
   (c) biaxially stretching the film at a longitudinal stretching ratio of 4:1 to 7:1 and a transverse stretching ratio of 6:1 to 11:1;
   (d) heat-setting the biaxially stretched film;
   (e) optionally corona-treating the biaxially stretched film; and
   (f) winding up the resulting composite film by drawing off with a draw-off roller having a temperature of between 10 and 90° C.

13. The method as claimed in claim 12, wherein the base layer further comprises at least one additive selected from the group consisting of hydrocarbon resins, antistatic agents, antiblocking agents, lubricants, stabilizers and neutralizing agents.

14. The method as claimed in claim 12, wherein said base layer consists essentially of (i) at least 50% by weight of polypropylene, relative to the total weight of said base layer, and (ii) up to 40% by weight of inert particulate material, relative to the total weight of said base layer.

15. The method as claimed in claim 14, wherein said composite film is opaque, white or white opaque.

16. The method as claimed in claim 12, wherein said polypropylene of the base layer comprises at least 90% of propylene and has a melt flow index of 0.5 g/10 minutes to 8 g/10 minutes according to DIN 53 735, and a melting point from 150 to 170° C.

17. A process for producing a composite film having a base layer comprising at least 50% by weight of polypropylene, and a sealable top layer comprising an isotactic homopolymer of polypropylene, said process comprising the steps of:

(a) coextruding melts of polypropylene and an isotactic homopolymer of an olefin through a flat die to produce individual layers of said composite film, wherein the base layer comprises polypropylene and the sealable top layer comprises an isotactic homopolymer of polypropylene;

(b) cooling the co-extruded film;

(c) biaxially stretching the film;

(d) heat-setting the biaxially stretched film;

(e) optionally corona-treating the biaxially stretched film; and (f) winding up the resulting composite film by drawing off with a draw-off roller.

* * * * *